(12) United States Patent
Kudoh et al.

US008999531B2

(10) Patent No.: US 8,999,531 B2
(45) Date of Patent: Apr. 7, 2015

(54) COATED CBN SINTERED BODY

(75) Inventors: Takahide Kudoh, Iwaki (JP); Naohiro Kagawa, Iwaki (JP); Takashi Umemura, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 221 days.

(21) Appl. No.: 13/639,994

(22) PCT Filed: Apr. 15, 2011

(86) PCT No.: PCT/JP2011/059334
§ 371 (c)(1),
(2), (4) Date: Oct. 8, 2012

(87) PCT Pub. No.: WO2011/129422
PCT Pub. Date: Oct. 20, 2011

(65) Prior Publication Data
US 2013/0034712 A1 Feb. 7, 2013

(30) Foreign Application Priority Data
Apr. 16, 2010 (JP) .................................. 2010-095230

(51) Int. Cl.
*C04B 41/00* (2006.01)
*C22C 26/00* (2006.01)
*C04B 35/5831* (2006.01)
*C04B 35/63* (2006.01)
*C04B 41/45* (2006.01)
*C04B 41/81* (2006.01)
*B22F 7/02* (2006.01)

(52) U.S. Cl.
CPC ............. *C22C 26/00* (2013.01); *C04B 35/5831* (2013.01); *C04B 35/6303* (2013.01); *C04B 41/009* (2013.01); *C04B 41/4529* (2013.01); *C04B 41/81* (2013.01); *B22F 7/02* (2013.01); C04B 2235/3217 (2013.01); C04B 2235/3804 (2013.01); C04B 2235/3813 (2013.01); C04B 2235/3843 (2013.01); C04B 2235/3847 (2013.01); C04B 2235/3852 (2013.01); C04B 2235/3856 (2013.01); C04B 2235/3865 (2013.01); C04B 2235/3886 (2013.01); C04B 2235/402 (2013.01); C04B 2235/5436 (2013.01); C04B 2235/5445 (2013.01); C04B 2235/5472 (2013.01); C04B 2235/80 (2013.01); C04B 2235/9607 (2013.01); C22C 2026/003 (2013.01)

(58) Field of Classification Search
CPC ... B22F 7/02; C04B 35/5231; C04B 35/6303; C04B 41/009; C04B 41/4529; C04B 41/81; C22C 26/00
USPC ............ 51/307, 309; 428/336, 457, 469, 472, 428/697, 698, 699, 701, 702, 704
See application file for complete search history.

(56) References Cited

U.S. PATENT DOCUMENTS

| 3,971,656 | A | | 7/1976 | Rudy | |
|---|---|---|---|---|---|
| 4,778,521 | A | | 10/1988 | Iyori et al. | |
| 4,911,756 | A | * | 3/1990 | Nakai et al. | 75/238 |
| 5,308,376 | A | | 5/1994 | Oskarsson | |
| 5,853,873 | A | | 12/1998 | Kukino et al. | |
| 5,882,777 | A | | 3/1999 | Kukino et al. | |
| 5,939,651 | A | | 8/1999 | Isobe et al. | |
| 6,057,046 | A | | 5/2000 | Tsuda et al. | |
| 6,140,262 | A | * | 10/2000 | Collier et al. | 407/119 |
| 6,299,992 | B1 | | 10/2001 | Lindskog et al. | |
| 6,316,094 | B1 | * | 11/2001 | Fukaya et al. | 428/698 |
| 6,814,775 | B2 | * | 11/2004 | Scurlock et al. | 51/307 |
| 7,618,720 | B2 | * | 11/2009 | Derflinger | 428/699 |
| 7,670,980 | B2 | * | 3/2010 | Dahl | 501/96.4 |
| 7,758,976 | B2 | * | 7/2010 | Kukino et al. | 428/698 |
| 7,771,847 | B2 | * | 8/2010 | Kukino et al. | 428/698 |
| 7,901,796 | B2 | * | 3/2011 | Fukui et al. | 428/697 |
| 7,932,199 | B2 | * | 4/2011 | McHale et al. | 51/309 |
| 8,124,553 | B2 | * | 2/2012 | Okamura et al. | 501/96.4 |
| 8,236,411 | B2 | * | 8/2012 | Waki et al. | 428/697 |
| 8,382,868 | B2 | * | 2/2013 | Goudemond et al. | 51/309 |
| 8,419,814 | B2 | * | 4/2013 | Can et al. | 51/307 |
| 8,500,834 | B2 | * | 8/2013 | Dole et al. | 51/307 |
| 8,673,435 | B2 | * | 3/2014 | Kudo et al. | 428/216 |
| 2004/0002418 | A1 | | 1/2004 | Scurlock et al. | |

(Continued)

FOREIGN PATENT DOCUMENTS

DE 19704242 C1 8/1998
EP 1714942 10/2006

(Continued)

OTHER PUBLICATIONS

*Kikai Gijutu* (2009) vol. 57, No. 4, pp. 32-37 with English translation (extract).
Suzuki, Hard Alloy and Sintered Hart Material (1986) p. 329, fig. 2.34.
Zhang S, et al "Solid Solution Extent of WC and TaC in Ti(C,N) as Revealed by Lattice Parameter Increase", Int. J. of Refractory Metals & Hard Materials, vol. 12, No. 6 (Jan. 1, 1993) pp. 329-333.
International Preliminary Report on Patentability (IPRP) dated Nov. 6, 2012 issued in PCT counterpart application (PCT/JP2011/059334).
International Search Report in PCT/JP2011/059334, dated Jun. 14, 2011.
Official action dated Aug. 13, 2013 issued in Japanese counterpart application (No. 2011-519398) with English translation.

(Continued)

*Primary Examiner* — Archene Turner
(74) *Attorney, Agent, or Firm* — Womble Carlyle

(57) ABSTRACT

A coated cBN sintered body has excellent wear resistance, fracture resistance, adhesiveness between a substrate and a coating, and a tool life of which is elongated as compared with conventional cBN sintered bodies. The coated cBN sintered body has a cBN sintered body substrate and a coating coated on the surface thereof. The cBN sintered body includes 76 to 90% by volume of cBN, and 10 to 24% by volume of a binder phase and inevitable impurities. An average grain size of cBN is 0.5 to 5.0 μm, an average value of the thickness of the binder phase is 0.05 to 0.8 μm, and the standard deviation of the thickness of the binder phase is 0.8 μm or less.

25 Claims, No Drawings

(56) References Cited

U.S. PATENT DOCUMENTS

| | | |
|---|---|---|
| 2004/0237840 A1 | 12/2004 | Yamamoto et al. |
| 2006/0222893 A1 | 10/2006 | Derflinger |
| 2006/0269788 A1 | 11/2006 | Ishikawa |
| 2007/0234646 A1 | 10/2007 | Can et al. |
| 2007/0269610 A1 | 11/2007 | Fukui et al. |
| 2008/0254282 A1 | 10/2008 | Kukino et al. |
| 2009/0049953 A1 | 2/2009 | Shindo et al. |
| 2011/0117368 A1 | 5/2011 | Matsubara et al. |
| 2012/0003466 A1 | 1/2012 | Tamura et al. |
| 2012/0114960 A1 | 5/2012 | Takesawa et al. |

FOREIGN PATENT DOCUMENTS

| | | |
|---|---|---|
| JP | 61-195950 | 8/1986 |
| JP | 61-227910 | 10/1986 |
| JP | 62-193731 | 8/1987 |
| JP | 62-265107 | 11/1987 |
| JP | 64-068443 | 3/1989 |
| JP | 02-015139 | 1/1990 |
| JP | 02-093036 | 4/1990 |
| JP | 04-231467 | 8/1992 |
| JP | 08-309605 | 11/1996 |
| JP | 09-078174 | 3/1997 |
| JP | 02-628200 | 7/1997 |
| JP | 10-110234 | 4/1998 |
| JP | 2000-44348 | 2/2000 |
| JP | 03-152105 | 4/2001 |
| JP | 2001-181825 | 7/2001 |
| JP | 2002-302732 | 10/2002 |
| JP | 2003-136305 | 5/2003 |
| JP | 2004-292842 | 10/2004 |
| JP | 2005-194573 | 7/2005 |
| JP | 2005-200668 | 7/2005 |
| JP | 2006-111947 | 4/2006 |
| JP | 2006-315898 | 11/2006 |
| JP | 2007-084382 | 4/2007 |
| JP | 2008-188689 | 8/2008 |
| JP | 2008-208027 | 9/2008 |
| JP | 2009-034781 | 2/2009 |
| JP | 2009-067637 | 4/2009 |
| JP | 2009-67637 | 4/2009 |
| JP | 2010-031308 | 2/2010 |
| WO | WO 98/34874 | 8/1998 |

OTHER PUBLICATIONS

M. Pancielejko et al "Structure, chemical and phase composition of hard titanium carbon nitride coatings deposited on HS 6-5-2 steel" *Journal of Materials Processing Technology*, 2004, vol. 157-158, pp. 394-398.

Takayuki Murotani et al "Study on stress measurement of PVD-coating layer" *Thin Solid Films*, 2000, vol. 377-378, pp. 617-620.

\* cited by examiner

COATED CBN SINTERED BODY

RELATED APPLICATIONS

This is a 371 US National Phase of International Patent Application No. PCT/JP2011/059334, filed Apr. 15, 2011, and published as WO 2011/129422A1 on Oct. 20, 2011, which claims priority to JP 2010-095230, filed Apr. 16, 2010. The contents of the aforementioned applications are incorporated by reference in their entirety.

TECHNICAL FIELD

The present invention relates to a coated cBN sintered body.

BACKGROUND ART

As a prior art of the cubic boron nitride sintered body (cBN), there is a cBN sintered body which is a sintered body where cBN particles are sintered by a binder phase, wherein the binder phase is continued in a two-dimensional view, the binder phase contains one or more selected from the group consisting of a carbide, nitride, carbonitride or boride of a transition metal of Groups 4a, 5a or 6a of the Periodic Table, a nitride, boride or oxide of Al, a carbide, nitride, carbonitride or boride of at least one of Fe, Co and Ni and mutual solid solutions thereof, a content of the cBN is 45-70% by volume, an average particle size of the cBN particles is 0.01 or more and less than 2.0 μm, an average value of a thickness of the binder phase is 1.0 μm or less, and its standard deviation is 0.7 or less (see Patent literature 1.).

Also, there is a sintered cBN compact which is a cubic boron nitride (cBN) sintered compact for a tool, comprising (a) about 60 to 80% by volume of cBN having a volume average particle size of about 3 to 6 μm, (b) about 40 to 20% by volume of a ceramic binder phase, (i) about 20 to 60% by volume of which comprises one or more of a carbide, nitride or boride of a Group IVB or Group VIB metal and (ii) about 40 to 80% by volume of which comprises one or more of a carbide, nitride, boride or oxide of aluminum, and (c) about 3 to 15% by weight of tungsten (see Patent literature 2.).

PRIOR ART LITERATURES

Patent Literatures

[Patent literature 1] JP 2008-208027A
[Patent literature 2] JP 2004-160637A

SUMMARY OF THE INVENTION

Problems to be Solved by the Invention

In recent years, in cutting, difficulty of cutting of work piece material has been increased on one hand, and high efficiency of the processing has been required on the other hand. When the cutting tools of the invention mentioned in the above Patent literature 1 or the invention mentioned in the above Patent literature 2 are used, there are problems that their fracture resistances are low, and they cannot sufficiently meet these requirements. The present invention has been made to solve the above-mentioned problems, and an object thereof is to provide a coated cBN sintered body which is excellent in wear resistance, fracture resistance, adhesiveness between coatings and the substrate, and which can elongate the tool life as compared with that of the conventional ones.

Means to Solve the Problems

The present inventors have intensively studied and as a result, they have obtained the knowledge that wear resistance and fracture resistance are both improved when the content of the cBN (cubic boron nitride) is made high, and a coating is covered on a substrate of the cBN sintered body in which dispersion of the thickness of the binder phase is made small. That is, the coated cBN sintered body of the present invention comprises a cBN sintered body substrate and a coating coated on the surface thereof, the cBN sintered body comprises 76 to 90% by volume of cBN, and 10 to 24% by volume of a binder phase and inevitable impurities, wherein an average grain size of the cBN is 0.5 to 5.0 μm, an average value of the thickness of the binder phase is 0.05 to 0.8 μm, the standard deviation of the thickness of the binder phase is 0.8 μm or less, more preferably thermal conductivity is 60 W/(m·K) or more, more preferably an amount of the tungsten element contained in the cBN sintered body is 0 to 8% by mass based on the whole cBN sintered body.

Effects of the Invention

The coated cBN sintered body of the present invention is excellent in wear resistance, fracture resistance, and adhesiveness between the substrate and the coating, and accomplishes the effect that the tool life can be elongated as compared with the conventional ones.

BEST MODE TO CARRY OUT THE INVENTION

In the cBN sintered body of the present invention, if the cBN is much in amount exceeding 90% by volume and the binder phase and inevitable impurities are less than 10% by volume, adhesiveness between the substrate and the coating becomes bad and wear resistance is lowered. To the contrary, if the cBN is less than 76% by volume and the binder phase and inevitable impurities are much in amount exceeding 24% by volume, the ratio of the binder phase having relatively low strength increases, whereby thermal conductivity is lowered, so that fracture resistance and wear resistance are both lowered. Therefore, the cBN is set at 76 to 90% by volume and the binder phase and inevitable impurities are set at 10 to 24% by volume. Among these, it is more preferred that the cBN is 77 to 85% by volume and the binder phase and inevitable impurities are 15 to 23% by volume, and among them, it is further preferred that the cBN is 77 to 83% by volume and the binder phase and inevitable impurities are 17 to 23% by volume. The contents of the cBN, and the binder phase and inevitable impurities can be determined by photographing the cross-sectional structure of the cBN sintered body with a SEM (scanning electron microscope) at 1000 to 5000-fold and analyzing the image of the photograph of the cross-sectional structure.

If the average grain size of the cBN of the present invention is less than 0.5 μm, the surface area of the binder phase surrounding the respective cBN grains becomes small, so that it is difficult to maintain the cBN during the cutting, thermal conductivity of the sintered body is lowered, progress of crack(s) cannot be suppressed whereby wear resistance and fracture resistance tend to be lowered. If the average grain size of the cBN becomes larger exceeding 5.0 μm, the binder phase becomes thick, so that strength is lowered and fracture resistance tends to be lowered. Therefore, the average grain size of the cBN is set at 0.5 to 5.0 µm. Among these, the average grain size of the cBN is preferably 0.7 to 4.0 µm, and among them, further preferably 1.5 to 4.0 µm. The average grain size of the cBN of the present invention can be determined by counting the number of the cBN contained in a unit length and a unit surface area from the photograph of the cross-sectional structure of the cBN sintered body photographed with SEM at the magnification of 1000 to 5000-fold, and using Fullman's equation (Formula 1).

$$dm=(4/\pi)\times(NL/NS) \quad \text{(Formula 1)}$$

(in Formula 1, dm represents an average grain size, π represents a circular constant, NL represents the number of the cBN per a unit length hit with an arbitrary line on the cross-sectional structure, and NS represents the number of the cBN contained in an arbitrary unit area.).

The binder phase of the cBN sintered body of the present invention comprises at least one selected from a metal of Ti, Zr, Hf, V, Nb, Ta, Cr, Mo, W, Co, Ni or Al, a carbide, carbonitride, nitride, boronitride, boride, or oxide of these metals, and mutual solid solutions thereof. Specifically, there may be mentioned TiN, TiCN, TiC, $TiB_2$, TiBN, TiAlN, $Ti_2AlN$, MN, $AlB_2$, $Al_2O_3$, ZrC, HfC, VC, NbC, TaC, $Cr_3C_2$, $Mo_2C$, ZrN, HfN, VN, NbN, TaN, CrN, WC, WB, $W_2B$, CoWB, $W_2Co_{21}B_6$, $Co_3W_3C$, W, Co, Ni, etc. Among these, in cutting of a hardened steel, it is more preferably at least one of TiN, TiCN, TiC, MN, $AlB_2$, $Al_2O_3$, $TiB_2$, CoWB, $W_2Co_{21}B_6$ and WC since the tool life is improved, and among them, when it is at least one of TiN, TiCN, TiC, MN, $AlB_2$, $Al_2O_3$ and $TiB_2$, it is further preferred since the tool life in cutting of a hardened steel is improved.

If an average value of the thickness of the binder phase of the cBN sintered body of the present invention is less than 0.05 µm, adhesiveness between the substrate and coating becomes bad, so that wear resistance is lowered, while if the average value of the thickness of the binder phase becomes large exceeding 0.8 µm, fracture resistance is lowered. Hence, the average value of the thickness of the binder phase is set to be 0.05 to 0.8 µm. Among these, the average value of the thickness of the binder phase is further preferably 0.1 to 0.5 µm.

The standard deviation of the thickness of the binder phase in the cBN sintered body of the present invention can be determined by using the following (Formula 2).

$$\sigma = \left( \frac{\sum_{i=1}^{n} (D_i - D)^2}{n} \right)^{1/2} \quad \text{(Formula 2)}$$

(In Formula 2, σ is a standard deviation of the thickness of the binder phase, $D_i$ is a measured value of the thickness of the binder phase, D is an average value of the thickness of the binder phase, and n is the number of the measurement.).

If the standard deviation of the thickness of the binder phase exceeds 0.8 µm, adhesiveness between the substrate and the coating and fracture resistance is lowered, so that it is set to be 0.8 µm or less. More preferred standard deviation of the thickness of the binder phase is 0.6 µm or less. Incidentally, it is difficult to actually make the standard deviation of the thickness of the binder phase less than 0.05 µm from the viewpoint of manufacture, so that the standard deviation of the thickness of the binder phase is practically preferably in the range of 0.05 to 0.8 µm, more preferably in the range of 0.05 to 0.6 µm. The average value and the standard deviation of the thickness of the binder phase can be obtained by taking a SEM photograph of the cross-sectional structure of the cBN sintered body at the magnification of 3000 to 5000-fold, arbitrarily drawing a straight lines on the obtained 3000 to 5000-fold photograph of the cross-sectional structure, and with regard to the binder phases on the straight lines, measuring the length cross-linking with the binder phases as a thickness of the binder phase, and calculating the average value and the standard deviation. It is preferred at this time to carry out measurement of a thickness of the binder phase by image analysis as well. Also, the number of the measurement of the thickness of the binder phase is preferably as many as possible since reliability of the average value and the standard deviation increases. Specifically, it is preferably measured, for example, with a measured number of 200 or more per one cross-section and at least three cross-sections with the total measured number of 600 or more.

In the preparation method of the cBN sintered body of the present invention, to realize the average value and the standard deviation of the thickness of the binder phase stipulated by the present invention, it is preferred to carry out a ball mill mixing using WC-based cemented carbide balls in the step of mixing the starting powders. However, when the WC-based cemented carbide balls are used, the tungsten element is migrated into the cBN sintered body. The tungsten element migrated into the cBN sintered body exists in the form of WC, WB, $W_2B$, CoWB, $W_2Co_{21}B_6$, $Co_3W_3C$, W, etc. These metal W and the tungsten compound likely become a origin of fracture or crack at the time of cutting, so that the amount of the tungsten element contained in the cBN sintered body of the present invention is preferably 0 to 8% by mass, among these, more preferably 0 to 5% by mass, and among them, further preferably 0 to 3% by mass. The amount of the tungsten element in the cBN sintered body of the present invention can be measured by using an EDS (energy dispersive X-ray spectroscopy) or ICP-AES (Inductively coupled plasma atomic emission spectroscopy), etc.

As the inevitable impurities in the cBN sintered body of the present invention mention may be made of Fe which is migrated in the manufacturing step of the cBN sintered body. Total amount of the inevitable impurities is 1.0% by mass or less based on the whole cBN sintered body, and it can be generally reduced to 0.5% by mass or less based on the whole cBN sintered body, so that they do not exert any influence on the characteristic values of the present invention. In the present invention, a small amount of the other component which cannot be said to be inevitable impurities may be contained in addition to the cBN, the binder phase and the inevitable impurities within the range which does not impair the characteristics of the cBN sintered body of the present invention.

If the thermal conductivity of the cBN sintered body of the present invention is less than 60 W/(m·K), wear due to chemical reaction occurs as the temperature elevates and it leads to the tendency of lowered wear resistance, so that the thermal conductivity of the cBN sintered body is preferably 60 W/(m·K) or more. The thermal conductivity of the cBN sintered body of the present invention is preferably as high as possible, and 75 W/(m·K) or more is further preferred. Incidentally, the thermal conductivity of the cBN sintered body of the present invention does not exceed 160 W/(m·K), so that the thermal conductivity is preferably in the range of 60 to 160 W/(m·K). The thermal conductivity of the cBN sintered body of the present invention can be measured by the laser flash method, etc.

The coated cBN sintered body in which a coating is coated on the surface of the cBN sintered body substrate of the present invention is preferred since wear resistance, lubricity and oxidation resistance are improved. The coating comprises at least one selected from a metal of Ti, Zr, Hf, V, Nb, Ta, Cr, Mo, W, Al or Si, an oxide, carbide, carbonitride, nitride or boride of these metals and mutual solid solutions thereof. There may be specifically mentioned TiC, TiCN, TiN, (Ti, Al)N, (Ti, Si)N, (Al, Cr)N, (Al, Cr)NO, (Ti, Al, Cr)N, $Al_2O_3$, $(Al, Cr)_2O_3$, etc. The coating may be constituted by either of a single layer or a laminated layer of 2 or more layers, and at least one layer of the coating may be an alternately laminated film in which thin layers having a layer thickness of 5 to 200 nm and having different compositions are alternately laminated. If the total film thickness of the whole coating is less than 0.3 μm in an average film thickness, the wear resistance is lowered, while if it exceeds 15 μm, fracture resistance is lowered, so that it is preferably 0.3 to 15 μm, and among these, 0.5 to 5 μm is further preferred. The coating can be coated by the conventionally known PVD method or CVD method.

The coated cBN sintered body of the present invention is excellent in wear resistance, fracture resistance, and adhesiveness between the substrate and the coating. When the coated cBN sintered body of the present invention is used as a cutting tool, the tool life can be elongated as compared with that of the conventional ones, so that it is preferred to use the same as a coated cBN sintered body for a cutting tool, and among these, it is further preferred to use the same as a coated cBN sintered body for a hardened steel cutting tool.

The coated cBN sintered body of the present invention can be prepared by, for example, the following method.

[Step 1] Coarse particle cBN powders having an average particle size of exceeding 2.0 μm and 7.0 μm or less, fine particle cBN powders having an average particle size 0.5 μm or more and 2.0 μm or less, and powders for forming the binder phase comprising at least one selected from a metal of Ti, Zr, Hf, V, Nb, Ta, Cr, Mo, W, Co, Ni or Al, a carbide, carbonitride, nitride, boride or oxide of these metals and a mutual solid solution thereof are prepared, and 56 to 76% by volume of the coarse particle cBN powders, 4 to 24% by volume of the fine particle cBN powders and 10 to 24% by volume of the powders for forming the binder phase (the total thereof is 100% by volume) are weighed so that the ratio of the coarse particle cBN powders and the fine particle cBN powders is in the range of the coarse particle cBN powders: fine particle cBN powders=(9.5 to 7):(0.5 to 3) (provided that the total of the coarse particle cBN powders and the fine particle cBN powders is 10.) in terms of a volume ratio. By adjusting the volume ratio of the coarse particle cBN powders having an average particle size of exceeding 2.0 μm and 7.0 μm or less and the fine particle cBN powders having an average particle size of 0.5 μm or more and 2.0 μm or less to the coarse particle cBN powders: fine particle cBN powders= (9.5 to 7):(0.5 to 3) (provided that the total of the coarse particle cBN powders and the fine particle cBN powders is 10.) as mentioned above, an average grain size of the cBN can be made within the range of 0.5 to 5.0 μm, a thickness of the binder phase of the cBN sintered body can be made thin and a thermal conductivity of the cBN sintered body can be made high.

[Step 2] Powders for forming the binder phase other than the cBN powders are mixed by using a wet ball mill comprising WC-based cemented carbide balls, an organic solvent and a pot, and the organic solvent is evaporated to obtain mixed powders.

[Step 3] The mixed powders are subjected to thermal treatment at a temperature of 700° C. or higher and 1000° C. or lower to react, whereby making it a phase with brittleness.

[Step 4] The phase with brittleness is mixed by using a wet ball mill comprising WC-based cemented carbide balls, an organic solvent and a pot to finely pulverize the phase.

[Step 5] The powders having a phase with brittleness obtained in Step 3 and the fine particle cBN powders having an average particle size of 0.5 μm or more and 2.0 μm or less are mixed, and the finely pulverized phase with brittleness and the fine particle cBN powders are disentangled and uniformly dispersed. The mixing method may be mentioned a wet ball mill with a mixing time of 1 to 24 hours, an ultrasonic wave mixing with a mixing time of 1 to 30 minutes, etc.

[Step 6] To the mixed powders obtained in Step 4 are added the coarse particle cBN powders having an average particle size of exceeding 2.0 μm and 7.0 μm or less, and the resulting mixture was mixed and uniformly dispersed. The mixing method may be mentioned a wet ball mill with a mixing time of 2 to 6 hours, an ultrasonic wave mixing with a mixing time of 1 to 30 minutes, etc.

[Step 7] The mixed powders obtained in Step 5 are put into a metal capsule made of Ta, Nb, Mo, Zr, etc., the metal capsule is mounted on an ultra-high pressure and high temperature generating apparatus, and subjected to sintering under the conditions of a pressure of 6 to 8 GPa and a temperature of 1200 to 1600° C. to obtain a cBN sintered body of the present invention.

[Step 8] A coating is coated on the surface of the cBN sintered body of the present invention by the PVD method or the CVD method to obtain a coated cBN sintered body of the present invention.

EXAMPLES

Example 1

Fine particle cBN powders having an average particle size of 1.0 μm, coarse particle cBN powders having an average particle size of 3.2 μm, TiN powders having an average particle size of 1.5 μm, Al powders having an average particle size of 3.1 μm, Co powders having an average particle size of 0.4 μm, and WC powders having an average particle size of 2.0 μm were prepared, and weighed so that the mixture had the formulation composition shown in Table 1. The powders for forming the binder phase other than the cBN powders were mixed by using a wet ball mill comprising WC-based cemented carbide balls, an organic solvent and a pot. The obtained mixed powders were subjected to heat treatment at 850° C. to make it a phase with brittleness. The obtained phase with brittleness was finely pulverized by using a wet ball mill comprising WC-based cemented carbide balls, an organic solvent and a pot. To the finely pulverized powders having a phase with brittleness were added the fine particle cBN powders having an average particle size of 1.0 μm, and the mixture was mixed by using a wet ball mill comprising WC-based cemented carbide balls, an organic solvent and a pot for 1 hour. To the mixture were further added the coarse particle cBN powders having an average particle size of 3.2 μm, and the mixture was mixed by using a wet ball mill comprising WC-based cemented carbide balls, an organic solvent and a pot for 6 hours. The obtained mixed powders were put into a Ta capsule, the Ta capsule was mounted on an ultra-high pressure and high temperature generating apparatus, and subjected to sintering with a sintering temperature and a sintering pressure shown in Table 2 to obtain cBN sintered bodies of Present products and Comparative products.

TABLE 1

| | Sample No. | Formulation composition (% by volume) of starting powders | | | | | | | |
|---|---|---|---|---|---|---|---|---|---|
| | | cBN | | | | | | | |
| | | Coarse particle Average particle size 3.2 μm | Fine particle Average particle size 1.0 μm | Coarse particle:Fine particle (Volume ratio) | Total | TiN | Al | Co | WC |
| Comparative products | 1 | 49.6 | 12.4 | 8:2 | 62 | 28 | 10 | — | — |
| | 2 | 52 | 13 | 8:2 | 65 | 25 | 10 | — | — |
| | 3 | 56 | 14 | 8:2 | 70 | 22 | 8 | — | — |
| | 4 | 60 | 15 | 8:2 | 75 | 17 | 8 | — | — |
| Present products | 5 | 64 | 16 | 8:2 | 80 | 12 | 8 | — | — |
| | 6 | 68 | 17 | 8:2 | 85 | 7 | 8 | — | — |
| | 7 | 72 | 18 | 8:2 | 90 | 5 | 5 | — | — |
| | 8 | 68 | 17 | 8:2 | 85 | — | 5 | 8 | 2 |

TABLE 2

| | Sample No. | Sintering conditions | |
|---|---|---|---|
| | | Sintering temperature (° C.) | Sintering pressure (GPa) |
| Comparative products | 1 | 1200 | 6.0 |
| | 2 | 1200 | 6.0 |
| | 3 | 1200 | 6.0 |
| | 4 | 1300 | 6.5 |
| Present products | 5 | 1450 | 7.4 |
| | 6 | 1450 | 7.4 |
| | 7 | 1600 | 7.7 |
| | 8 | 1450 | 7.4 |

With regard to the obtained cBN sintered bodies, X-ray diffraction measurement was carried out to qualitatively analyze the compositions of the cBN sintered bodies. Next, the cross-sectional structure of the cBN sintered bodies was photographed by SEM at the magnification of 3000 to 5000-fold. The obtained photograph of the cross-sectional structure was image-analyzed to determine the contents (% by volume) of the cBN and the binder phase. Also, straight lines were arbitrarily drawn in the photograph of the cross-sectional structure, then, with regard to the binder phase on the straight lines, the length of the straight lines cross-linking with the binder phase was measured as the thickness of the binder phase, and the average value and the standard deviation thereof were determined. At this time, the number of measurements of the thickness of the binder phase was 600 points per one sample. Moreover, from the photograph of the cross-sectional structure taken by SEM at the magnification of 1000 to 5000-fold, numbers of the cBN per unit length and unit area were counted, and an average grain size of the cBN was determined by using Fullman's equation.

TABLE 3

| | Sample No. | Sintered body | | | | | |
|---|---|---|---|---|---|---|---|
| | | cBN | | Binder phase | | | |
| | | | | Amount of | | Thickness of binder phase | |
| | | Amount of cBN (% by volume) | Average grain size (μm) | binder phase (% by volume) | Composition of binder phase | Average value (μm) | Standard deviation (μm) |
| Comparative products | 1 | 60 | 2.1 | 40 | TiN, TiB$_2$, AlB$_2$, AlN, Al$_2$O$_3$, WB, W$_2$B, WC, W | 1.0 | 1.0 |
| | 2 | 63 | 2.1 | 37 | TiN, TiB$_2$, AlB$_2$, AlN, Al$_2$O$_3$, WB, W$_2$B, WC, W | 0.8 | 0.8 |
| | 3 | 68 | 2.1 | 31 | TiN, TiB$_2$, AlB$_2$, AlN, | 0.6 | 0.6 |

TABLE 3-continued

| | | cBN | | Amount of binder | | Thickness of binder phase | |
|---|---|---|---|---|---|---|---|
| | Sample No. | Amount of cBN (% by volume) | Average grain size (μm) | phase (% by volume) | Composition of binder phase | Average value (μm) | Standard deviation (μm) |
| Present products | 4 | 74 | 2.1 | 26 | Al$_2$O$_3$, WB, W$_2$B, WC, W TiN, TiB$_2$, AlB$_2$, AlN | 0.5 | 0.5 |
| | 5 | 77 | 2.1 | 23 | Al$_2$O$_3$, WB, W$_2$B, WC, W TiN, TiB$_2$, AlB$_2$, AlN | 0.3 | 0.4 |
| | 6 | 83 | 2.1 | 17 | Al$_2$O$_3$, WB, WC TiN, TiB$_2$, AlB$_2$, AlN | 0.3 | 0.3 |
| | 7 | 89 | 2.1 | 11 | Al$_2$O$_3$, WB, WC TiN, TiB$_2$, AlB$_2$, AlN | 0.2 | 0.2 |
| | 8 | 83 | 2.1 | 17 | Al$_2$O$_3$, WB, WC CoWB, W$_2$Co$_{21}$B$_6$, WC, AlN, Al$_2$O$_3$ | 0.3 | 0.4 |

An amount of the tungsten element contained in the cBN sintered body was measured by using EDS. The thermal conductivity of the cBN sintered body was measured by the laser flash method. These results are shown in Table 4.

TABLE 4

| | Sample No. | Amount of tungsten element (% by mass) | Thermal conductivity (W/(m · K)) |
|---|---|---|---|
| Comparative products | 1 | 2.8 | 61 |
| | 2 | 3.1 | 64 |
| | 3 | 3.3 | 75 |
| | 4 | 4.0 | 83 |
| Present products | 5 | 4.6 | 90 |
| | 6 | 5.4 | 97 |
| | 7 | 6.4 | 105 |
| | 8 | 7.1 | 105 |

Each of the cBN sintered bodies of Samples Nos. 1 to 6 and 8 was cut into the predetermined shape by a wire electric discharge machine, and the cBN sintered body of Sample No. 7 by a laser processing machine, and brazed to a cemented carbide substrate with the CNGA shape, and subjected to grinding process to obtain each cutting tool having a shape of an ISO standard CNGA120408 cutting insert. This cutting tool was coated with a TiCN film having an average film thickness of 1.0 μm by the PVD method to obtain a cutting tool comprising the coated cBN sintered body.

The following cutting tests were carried out by using the cutting tools of Present products and Comparative products. Tool life of Present products and Comparative products are shown in Table 5.

[Continuous Cutting Test]
Cutting way: Turning,
Work piece material: SCM415H (Shape: cylindrical),
Cutting speed: 130 m/min,
Feed rate: 0.15 mm/rev,
Depth of cut: 0.15 mm,
Cooling method: Wet cutting,
Judgment criteria of tool life: When flank wear of the cutting tool exceeded 0.1 mm, then, it was defined to be a tool life.

[Interrupted Cutting Test]
Cutting way: Turning,
Work piece material: SCM435H (Shape: substantially cylindrical shape in which 2 V-shaped grooves were provided to the cylinder),
Cutting speed: 130 m/min,
Feed rate: 0.15 mm/rev,
Depth of cut: 0.15 mm,
Cooling method: Wet cutting,
Judgment criteria of tool life: When the cutting tool was fractured, then, it was defined to be a tool life.

TABLE 5

| | Sample No. | Tool life by Continuous cutting test (min) | Tool life by Interrupted cutting test (min) |
|---|---|---|---|
| Comparative products | 1 | 28 | 19 |
| | 2 | 29 | 24 |
| | 3 | 35 | 29 |
| | 4 | 60 | 34 |
| Present products | 5 | 88 | 72 |
| | 6 | 81 | 57 |
| | 7 | 73 | 40 |
| | 8 | 62 | 35 |

From Table 5, it can be understood that Present products have longer tool lives than those of Comparative products. When the cBN amount becomes large exceeding 80% by volume, a ratio of the binder phase becomes small, so that adhesiveness between the substrate and the coating is lowered. The tool life tends to be lowered by an increased amount of the tungsten element. If the cBN amount is less than 75% by volume, thermal conductivity is lowered, the average value and the standard deviation of the thickness of the binder phase become large, so that the tool life is lowered.

Example 2

Fine particle cBN powders having an average particle size of 1.0 μm, coarse particle cBN powders having an average particle size of 3.2 μm, TiN powders having an average particle size of 1.5 μm, TiC powders having an average particle size of 1.2 μm, TiCN powders having an average particle size of 1.2 μm, and Al powders having an average particle size of 3.1 μm were prepared, and weighed so that they had the formulation composition as shown in Table 6.

Powders for forming the binder phase other than the cBN powders were mixed by using a wet ball mill comprising WC-based cemented carbide balls, an organic solvent and a pot. The obtained mixed powders were subjected to heat treatment at 850° C. to react, whereby preparing a phase having brittleness. The obtained phase having brittleness was finely pulverized by using a wet ball mill comprising WC-based cemented carbide balls, an organic solvent and a pot. With regard to Samples Nos. 9 to 12, 14 and 15, to the finely pulverized powders having a phase with brittleness were added the fine particle cBN powders having an average particle size of 1.0 μm, and was mixed by using a wet ball mill comprising WC-based cemented carbide balls, an organic solvent and a pot according to the mixing method shown in Table 7. With regard to Sample No. 13, to the finely pulverized powders having a phase with brittleness were added the fine particle cBN powders having an average particle size of 1.0 μm, and the mixture was subjected to ultrasonic-wave mixing shown in Table 7.

With regard to Samples Nos. 9 to 12, 14 and 15, the coarse particle cBN powders having an average particle size of 3.2 μm were further added to the obtained mixture, and mixed by the mixing method shown in Table 8 using a wet ball mill comprising WC-based cemented carbide balls, an organic solvent and a pot. With regard to Sample No. 13, the coarse particle cBN powders having an average particle size of 3.2 μm were further added to the obtained mixture, and subjected to ultrasonic wave mixing shown in Table 8.

TABLE 6

| | | Formulation composition (% by volume) of starting powders | | | | | | | |
|---|---|---|---|---|---|---|---|---|---|
| | | cBN | | | | | | | |
| | Sample No. | Coarse particle Average particle size: 3.2 μm | Fine particle Average particle size: 1.0 μm | Coarse particle:Fine particle (Volume ratio) | Total | TiN | TiC | TiCN | Al |
| Comparative products | 9 | 64 | 16 | 8:2 | 80 | 12 | — | — | 8 |
| | 10 | 64 | 16 | 8:2 | 80 | 12 | — | — | 8 |
| Present products | 11 | 64 | 16 | 8:2 | 80 | 12 | — | — | 8 |
| | 12 | 64 | 16 | 8:2 | 80 | 12 | — | — | 8 |
| | 13 | 64 | 16 | 8:2 | 80 | 12 | — | — | 8 |
| | 14 | 64 | 16 | 8:2 | 80 | — | 12 | — | 8 |
| | 15 | 64 | 16 | 8:2 | 80 | — | — | 12 | 8 |

TABLE 7

| | Sample No. | Mixing method of powders having a phase with brittleness, and fine particle cBN powders having an average particle size of 1.0 μm |
|---|---|---|
| Comparative products | 9 | Ball milling mixing for 24 hours |
| | 10 | Ball milling mixing for 9 hours |
| Present products | 11 | Ball milling mixing for 1 hour |
| | 12 | Ball milling mixing for 1 hour |
| | 13 | Ultrasonic wave mixing for 15 minutes |
| | 14 | Ball milling mixing for 1 hour |
| | 15 | Ball milling mixing for 1 hour |

TABLE 8

| | Sample No. | Mixing method after adding coarse particle cBN powders having an average particle size of 3.2 μm |
|---|---|---|
| Comparative products | 9 | Ball milling mixing for 6 hours |
| | 10 | Ball milling mixing for 6 hours |
| Present products | 11 | Ball milling mixing for 6 hours |
| | 12 | Ball milling mixing for 2 hours |
| | 13 | Ultrasonic wave mixing for 15 minutes |
| | 14 | Ball milling mixing for 2 hours |
| | 15 | Ball milling mixing for 2 hours |

The obtained mixed powders were put into a Ta capsule, the Ta capsule was mounted on an ultra-high pressure and high temperature generating apparatus, and subjected to sintering with a sintering pressure of 7.4 GPa and a sintering temperature of 1450° C. to obtain cBN sintered bodies. With regard to the obtained cBN sintered bodies, a composition of each cBN sintered body, amounts of the cBN and the binder phase, an average grain size of the cBN, an average value and standard deviation of the thickness of the binder phase were measured in the same manner as in Example 1. These results are shown in Table 9.

TABLE 9

| | Sample No. | cBN Amount of cBN (% by volume) | cBN Average grain size (μm) | Binder phase Amount of binder phase (% by volume) | Binder phase Composition of binder phase | Thickness of binder phase Average value (μm) | Thickness of binder phase Standard deviation (μm) |
|---|---|---|---|---|---|---|---|
| Comparative products | 9 | 73 | 2.1 | 27 | TiN, TiB$_2$, AlB$_2$, AlN, Al$_2$O$_3$, WB, WC | 0.5 | 0.5 |
| | 10 | 75 | 2.1 | 25 | TiN, TiB$_2$, AlB$_2$, AlN, Al$_2$O$_3$, WB, WC | 0.4 | 0.4 |
| Present products | 11 | 77 | 2.1 | 23 | TiN, TiB$_2$, AlB$_2$, AlN, Al$_2$O$_3$, WB, WC | 0.3 | 0.4 |
| | 12 | 78 | 2.1 | 22 | TiN, TiB$_2$, AlB$_2$, AlN, Al$_2$O$_3$, WB, WC | 0.3 | 0.4 |
| | 13 | 79 | 2.1 | 21 | TiN, TiB$_2$, AlB$_2$, AlN, Al$_2$O$_3$, WB, WC | 0.3 | 0.4 |
| | 14 | 78 | 2.1 | 22 | TiC, TiB$_2$, AlB$_2$, AlN, Al$_2$O$_3$, WB, WC | 0.3 | 0.4 |
| | 15 | 78 | 2.1 | 22 | TiCN, TiB$_2$, AlB$_2$, AlN, Al$_2$O$_3$, WB, WC | 0.3 | 0.4 |

An amount of the tungsten element contained in the cBN sintered body was measured by using EDS. The thermal conductivity of the cBN sintered body was measured by the laser flash method. These results are shown in Table 10.

TABLE 10

| | Sample No. | Amount of tungsten element (% by mass) | Thermal conductivity (W/(m·K)) | Tool life by Interrupted cutting test (min) |
|---|---|---|---|---|
| Comparative products | 9 | 13.6 | 84 | 28 |
| | 10 | 7.3 | 86 | 54 |
| Present products | 11 | 4.6 | 90 | 72 |
| | 12 | 1.8 | 92 | 76 |
| | 13 | 0.2 | 95 | 77 |
| | 14 | 1.8 | 93 | 77 |
| | 15 | 1.8 | 92 | 76 |

Each of the cBN sintered bodies was cut into the predetermined shape by a wire electric discharge machine, and brazed to a cemented carbide substrate with the CNGA shape, and subjected to grinding process to obtain each cutting tool having a shape of an ISO standard CNGA120408 cutting insert. The cutting tool was coated with a (Al, Cr)N film having an average film thickness of 1.3 μm by the PVD method to obtain a cutting tool comprising the coated cBN sintered body. By using the obtained cutting tools, the following cutting tests were carried out.

[Interrupted Cutting Test]
Cutting way: Turning,
Work piece material: SCM435H (Shape: substantially cylindrical shape in which two V-shaped grooves are provided to the cylinder),
Cutting speed: 130 m/min,
Feed rate: 0.15 mm/rev,
Depth of cut: 0.15 mm,
Cooling method: Wet cutting,
Judgment criteria of tool life: When the cutting tool was fractured, then, it was defined to be a tool life.

The results of the cutting test were also shown in Table 10. From Table 10, it can be understood that when the amount of the tungsten element contained in the cBN sintered body becomes larger, fracture resistance tends to be lowered.

Example 3

Fine particle cBN powders having an average particle size of 0.4 to 1.0 μm, coarse particle cBN powders having an average particle size of 3.2 to 5.7 μm, TiN powders having an average particle size of 1.5 μm and Al powders having an average particle size of 3.1 μm were prepared, and weighed so that they had the formulation composition shown in Table 11.

TABLE 11

| | Sample No. | cBN Coarse particle Average particle size (μm) | cBN Coarse particle Formulation composition (% by volume) | cBN Fine particle Average particle size (μm) | cBN Fine particle Formulation composition (% by volume) | Coarse particle:Fine particle (volume ratio) | Total Formulation composition (% by volume) | TiN Formulation composition (% by volume) | Al Formulation composition (% by volume) |
|---|---|---|---|---|---|---|---|---|---|
| Comparative product | 16 | — | 0 | 0.4 | 80 | 0:10 | 80 | 11 | 9 |
| Present products | 17 | 3.2 | 56 | 1.0 | 24 | 7:3 | 80 | 12 | 8 |
| | 18 | 2.4 | 72 | 1.0 | 8 | 9:1 | 80 | 12 | 8 |
| | 19 | 3.2 | 64 | 1.0 | 16 | 8:2 | 80 | 12 | 8 |

TABLE 11-continued

| | | Starting powders | | | | | | |
|---|---|---|---|---|---|---|---|---|
| | | cBN | | | | | | |
| | | Coarse particle | | Fine particle | | Coarse particle:Fine particle (volume ratio) | Total Formulation composition (% by volume) | TiN Formulation composition (% by volume) | Al Formulation composition (% by volume) |
| | Sample No. | Average particle size (μm) | Formulation composition (% by volume) | Average particle size (μm) | Formulation composition (% by volume) | | | | |
| | 20 | 3.8 | 72 | 1.0 | 8 | 9:1 | 80 | 12 | 8 |
| | 21 | 5.7 | 76 | 1.0 | 4 | 9.5:0.5 | 80 | 12 | 8 |
| Comparative product | 22 | 5.7 | 80 | — | 0 | 10:0 | 80 | 12 | 8 |

With regard to Sample No. 16 and Sample No. 22, powders for forming the binder phase other than the cBN powders were mixed by using a wet ball mill comprising WC-based cemented carbide balls, an organic solvent and a pot. The obtained mixed powders were heat treated at 850° C. to react, whereby preparing a phase having brittleness. The obtained phase having brittleness was finely pulverized by using a wet ball mill comprising WC-based cemented carbide balls, an organic solvent and a pot. With regard to Sample No. 16, to the finely pulverized powders having a phase with brittleness were added the fine particle cBN powders having an average particle size of 0.4 μm shown in Table 11, and mixed by using a wet ball mill comprising WC-based cemented carbide balls, an organic solvent and a pot for 10 hours. With regard to Sample No. 22, to the finely pulverized powders having a phase with brittleness were added the coarse particle cBN powders having an average particle size of 5.7 μm shown in Table 11, and mixed by using a wet ball mill comprising WC-based cemented carbide balls, an organic solvent and a pot for 6 hours. The obtained mixed powders were put into a Ta capsule, the Ta capsule was mounted on an ultra-high pressure and high temperature generating apparatus, and subjected to sintering at a sintering temperature and a sintering pressure shown in Table 12 to obtain cBN sintered bodies.

With regard to Samples Nos. 17 to 21, powders for forming the binder phase other than the cBN powders were mixed by using a wet ball mill comprising WC-based cemented carbide balls, an organic solvent and a pot. The obtained mixed powders were subjected to heat treatment at 850° C. to react, whereby preparing a phase having brittleness. The obtained phase with brittleness was finely pulverized by using a wet ball mill comprising WC-based cemented carbide balls, an organic solvent and a pot. To the finely pulverized powders having the phase with brittleness were added the fine particle cBN powders having an average particle size of 1.0 μm shown in Table 11, and mixed by using a wet ball mill comprising WC-based cemented carbide balls, an organic solvent and a pot for 1 hour. To the mixture were further added the coarse particle cBN powders having an average particle size of 2.4 to 5.7 μm, and mixed by using a wet ball mill comprising WC-based cemented carbide balls, an organic solvent and a pot for 6 hours. The obtained mixed powders were put into a Ta capsule, the Ta capsule was mounted on an ultra-high pressure and high temperature generating apparatus, and subjected to sintering with the sintering temperature and the sintering pressure shown in Table 12 to obtain cBN sintered bodies.

TABLE 12

| | | Sintering conditions | |
|---|---|---|---|
| | Sample No. | Sintering temperature (° C.) | Sintering pressure (GPa) |
| Comparative product | 16 | 1500 | 7.6 |
| Present products | 17 | 1450 | 7.4 |
| | 18 | 1450 | 7.4 |
| | 19 | 1450 | 7.4 |
| | 20 | 1450 | 7.4 |
| | 21 | 1450 | 7.4 |
| Comparative product | 22 | 1450 | 7.4 |

With regard to the obtained cBN sintered bodies, a composition of the cBN sintered body, amounts of the cBN and the binder phase, an average grain size of the cBN, an average value and standard deviation of the thickness of the binder phase were measured in the same manner as in Example 1. These results are shown in Table 13.

TABLE 13

| | | Sintered body | | | | | |
|---|---|---|---|---|---|---|---|
| | | cBN | | Binder phase | | Thickness of binder phase | |
| | Sample No. | Amount of cBN (% by volume) | Average grain size (μm) | Amount of binder phase (% by volume) | Composition of binder phase | Average value (μm) | Standard deviation (μm) |
| Comparative product | 16 | 78 | 0.3 | 22 | TiN, TiB$_2$, AlB$_2$, AlN, Al$_2$O$_3$, WB, WC | 0.1 | 0.1 |
| Present products | 17 | 77 | 1.8 | 23 | TiN, TiB$_2$, AlB$_2$, AlN, Al$_2$O$_3$, WB, WC | 0.2 | 0.2 |

TABLE 13-continued

| | | Sintered body | | | | | |
|---|---|---|---|---|---|---|---|
| | | cBN | | Amount | | Binder phase | |
| | | | | | | Thickness of binder phase | |
| | | Amount | Average | of binder | | | |
| Sample No. | | of cBN (% by volume) | grain size (μm) | phase (% by volume) | Composition of binder phase | Average value (μm) | Standard deviation (μm) |
| | 18 | 77 | 2.5 | 23 | TiN, TiB$_2$, AlB$_2$, AlN, Al$_2$O$_3$, WB, WC | 0.4 | 0.4 |
| | 19 | 77 | 2.1 | 23 | TiN, TiB$_2$, AlB$_2$, AlN, Al$_2$O$_3$, WB, WC | 0.3 | 0.4 |
| | 20 | 77 | 3.1 | 23 | TiN, TiB$_2$, AlB$_2$, AlN, Al$_2$O$_3$, WB, WC | 0.4 | 0.4 |
| | 21 | 78 | 3.8 | 22 | TiN, TiB$_2$, AlB$_2$, AlN, Al$_2$O$_3$, WB, WC | 0.4 | 0.5 |
| Comparative product | 22 | 79 | 5.5 | 21 | TiN, TiB$_2$, AlB$_2$, AlN, Al$_2$O$_3$, WB, WC | 0.5 | 0.6 |

An amount of the tungsten element contained in the cBN sintered body was measured by using EDS. Also, the thermal conductivity of the cBN sintered body was measured by the laser flash method. These results are shown in Table 14.

TABLE 14

| | Sample No. | Amount of tungsten element (% by mass) | Thermal conductivity (W/(m · K)) |
|---|---|---|---|
| Comparative product | 16 | 2.0 | 70 |
| Present products | 17 | 3.3 | 81 |
| | 18 | 4.8 | 99 |
| | 19 | 4.6 | 90 |
| | 20 | 5.1 | 100 |
| | 21 | 5.6 | 103 |
| Comparative product | 22 | 6.3 | 108 |

Each of the cBN sintered bodies was cut into the predetermined shape by a wire electric discharge machine, and brazed to a cemented carbide substrate with the CNGA shape, and subjected to grinding process to obtain each cutting tool having a shape of an ISO standard CNGA120408 cutting insert. The cutting tool was coated with a coating comprising an alternately laminated film in which a thin layer comprising (Ti, Si)N with a layer thickness of 20 nm and a thin layer comprising (Al, Cr)N with a layer thickness of 20 nm were alternately laminated, by the PVD method, with a total film thickness of the whole coating being 1.8 μm in an average film thickness. As a result, a cutting tool comprising the coated cBN sintered body was obtained. By using the obtained cutting tools, the following cutting tests were carried out. Tool life of the cutting tool is shown in Table 15.

[Continuous Cutting Test]
Cutting way: Turning,
Work piece material: SCM415H (Shape: cylindrical),
Cutting speed: 130 m/min,
Feed rate: 0.15 mm/rev,
Depth of cut: 0.15 mm,
Cooling method: Wet cutting,
Judgment criteria of tool life: When flank wear of the cutting tool exceeded 0.1 mm, then, it was defined to be a tool life.

[Interrupted Cutting Test]
Cutting way: Turning,
Work piece material: SCM435H (Shape: substantially cylindrical shape in which two V-shaped grooves are provided to the cylinder),
Cutting speed: 130 m/min,
Feed rate: 0.15 mm/rev,
Depth of cut: 0.15 mm,
Coolong method: Wet cutting,
Judgment criteria of tool life: When the cutting tool was fractured, then, it was defined to be a tool life.

TABLE 15

| | Sample No. | Tool life by Continuous cutting test (min) | Tool life by Interrupted cutting test (min) |
|---|---|---|---|
| Comparative product | 16 | 38 | 21 |
| Present products | 17 | 58 | 58 |
| | 18 | 73 | 72 |
| | 19 | 71 | 75 |
| | 20 | 87 | 74 |
| | 21 | 82 | 72 |
| Comparative product | 22 | 56 | 54 |

From Table 15, it can be understood that wear resistance and fracture resistance of Sample No. 16 are low. This is because the cBN is fine grains so that its thermal conductivity is low, whereby the crack is considered to be easily propagated. Also, from Table 15, it can be understood that wear resistance and fracture resistance of Sample No. 22 are low. This is because the cBN is coarse grains so that the average value and the standard deviation of the thickness of the binder phase are both large, whereby the binder phase is considered to be selectively worn.

The invention claimed is:
1. A coated cBN sintered body which comprises a cBN sintered body substrate and a coating coated on the surface thereof, wherein
the cBN sintered body comprises 76 to 90% by volume of cBN and 10 to 24% by volume of a binder phase and inevitable impurities, an average grain size of the cBN is 1.5 to 4.0 µm,
an average value of a thickness of the binder phase is 0.05 to 0.8 µm, and
a standard deviation of the thickness of the binder phase is 0.8 µm or less;
wherein the cBN is a sintered product of a mixture comprising
coarse particle cBN powders having an average particle size of exceeding 2.0 µm and 7.0 µm or less, and
fine particle cBN powders having an average particle size of 0.5 µm or more and 2.0 µm or less,
with a volume ratio in the range of coarse particle cBN powders: fine particle cBN powders=9.5 to 7: 0.5 to 3, provided that a total of the coarse particle cBN powders and the fine particle cBN powders is 10.

2. The coated cBN sintered body according to claim 1, wherein the cBN sintered body comprises 77 to 85% by volume of cBN and 15 to 23% by volume of the binder phase and inevitable impurities.

3. The coated cBN sintered body according to claim 1, wherein the cBN sintered body comprises 77 to 83% by volume of cBN and 17 to 23% by volume of the binder phase and inevitable impurities.

4. The coated cBN sintered body according to claim 1, wherein an average value of a thickness of the binder phase is in the range of 0.1 to 0.5 µm.

5. The coated cBN sintered body according to claim 1, wherein a standard deviation of a thickness of the binder phase is in the range of 0.05 to 0.8 µm.

6. The coated cBN sintered body according to claim 1, wherein a standard deviation of a thickness of the binder phase is in the range of 0.05 to 0.6 µm.

7. The coated cBN sintered body according to claim 1, wherein the binder phase comprises at least one selected from a metal of Ti, Zr, Hf, V, Nb, Ta, Cr, Mo, W, Co, Ni or Al, a carbide, carbonitride, nitride, boronitride, boride or oxide of these metals, and mutual solid solutions thereof.

8. The coated cBN sintered body according to claim 1, wherein the binder phase comprises at least one selected from the group consisting of TiN, TiCN, TiC, TiB$_2$, TiBN, TiAlN, Ti$_2$AlN, AlN, AlB$_2$, Al$_2$O$_3$, ZrC, HfC, VC, NbC, TaC, Cr$_3$C$_2$, Mo$_2$C, ZrN, HfN, VN, NbN, TaN, CrN, WC, WB, W$_2$B, CoWB, W$_2$Co$_{21}$B$_6$, Co$_3$W$_3$C, W, Co and Ni.

9. The coated cBN sintered body according to claim 1, wherein the binder phase comprises at least one selected from the group consisting of TiN, TiCN, TiC, AlN, AlB$_2$, Al$_2$O$_3$, TiB$_2$, CoWB, W$_2$Co$_{21}$B$_6$ and WC.

10. The coated cBN sintered body according to claim 1, wherein the binder phase comprises at least one selected from the group consisting of TiN, TiCN, TiC, AlN, AlB$_2$, Al$_2$O$_3$ and TiB$_2$.

11. The coated cBN sintered body according to claim 1, wherein the coating comprises at least one selected from a metal of Ti, Zr, Hf, V, Nb, Ta, Cr, Mo, W, Al or Si, an oxide, carbide, carbonitride, nitride or boride of these metals and mutual solid solutions thereof.

12. The coated cBN sintered body according to claim 1, wherein the coating comprises at least one selected from the group consisting of TiC, TiCN, TiN, (Ti, Al)N, (Ti, Si)N, (Al, Cr)N, (Al, Cr)NO, (Ti, Al, Cr)N, Al$_2$O$_3$ and (Al, Cr)$_2$O$_3$.

13. The coated cBN sintered body according to claim 1, wherein at least one layer of the coating is an alternately laminated film where thin films having a layer thickness of 5 to 200 nm and having different compositions are alternately laminated.

14. The coated cBN sintered body according to claim 1, wherein an average thickness of the whole coating is 0.3 to 15 µm.

15. The coated cBN sintered body according to claim 1, wherein a total an average thickness of the whole coating is 0.5 to 5 µm.

16. The coated cBN sintered body according to claim 1, wherein thermal conductivity of the cBN sintered body is 60 W/(m·K) or more.

17. The coated cBN sintered body according to claim 1, wherein thermal conductivity of the cBN sintered body is 75 W/(m·K) or more.

18. The coated cBN sintered body according to claim 1, wherein thermal conductivity of the cBN sintered body is 160 W/(m·K) or less.

19. The coated cBN sintered body according to claim 1, wherein an amount of the tungsten element contained in the cBN sintered body is 0 to 8% by mass based on the whole cBN sintered body.

20. The coated cBN sintered body according to claim 1, wherein the cBN is a sintered product of a mixture comprising
56 to 76% by volume of coarse particle cBN powders,
4 to 24% by volume of fine particle cBN powders, and
10 to 24% by volume of powders for forming the binder phase, with the total amount thereof being 100% by volume.

21. A cutting tool comprising the coated cBN sintered body according claim 1.

22. The cutting tool according to claim 21, wherein the coated cBN sintered body comprises:
77 to 83% by volume of cBN;
17 to 23% by volume of a binder phase and inevitable impurities, and
a coating,
wherein:
an average value of a thickness of the binder phase is 0.1 to 0.5 µm,
a standard deviation of the thickness of the binder phase is 0.05 to 0.8 µm,
the binder phase comprises at least one selected from the group consisting of TiN, TiCN, TiC, AN, AlB$_2$, Al$_2$O$_3$ and TiB$_2$,
the coating has an average thickness between 0.5 and 5 µm, and
the coating comprises at least one selected from the group consisting of TiC, TiCN, TiN, (Ti, Al)N, (Ti, Si)N, (Al, Cr)N, (Al, Cr)NO, (Ti, Al, Cr)N, Al$_2$O$_3$ and (Al, Cr)$_2$O$_3$, and
the thermal conductivity of the cBN sintered body is between 75 W/(m·K) and 160 W/(m·K).

23. The cutting tool according to claim 22, wherein:
at least one layer of the coating is an alternately laminated film where thin films having a layer thickness of 5 to 200 nm and having different compositions are alternately laminated.

24. The cutting tool according to claim 22, wherein:
an amount of the tungsten element contained in the cBN sintered body is 0 to 8% by mass based on the whole cBN sintered body.

25. The cutting tool according to claim 22, wherein the cBN is a sintered product of a mixture comprising:
56 to 76% by volume of coarse particle cBN powders,
4 to 24% by volume of fine particle cBN powders, and
10 to 24% by volume of powders for forming the binder phase, with the total amount thereof being 100% by volume.

* * * * *